Jan. 30, 1951 W. D. THOMPSON 2,540,017
PHOTOGRAPHIC ENLARGER
Original Filed Oct. 24, 1946 4 Sheets-Sheet 1

INVENTOR.
WILLIAM D. THOMPSON.
BY
ATTORNEY.

Jan. 30, 1951   W. D. THOMPSON   2,540,017
PHOTOGRAPHIC ENLARGER
Original Filed Oct. 24, 1946   4 Sheets-Sheet 2
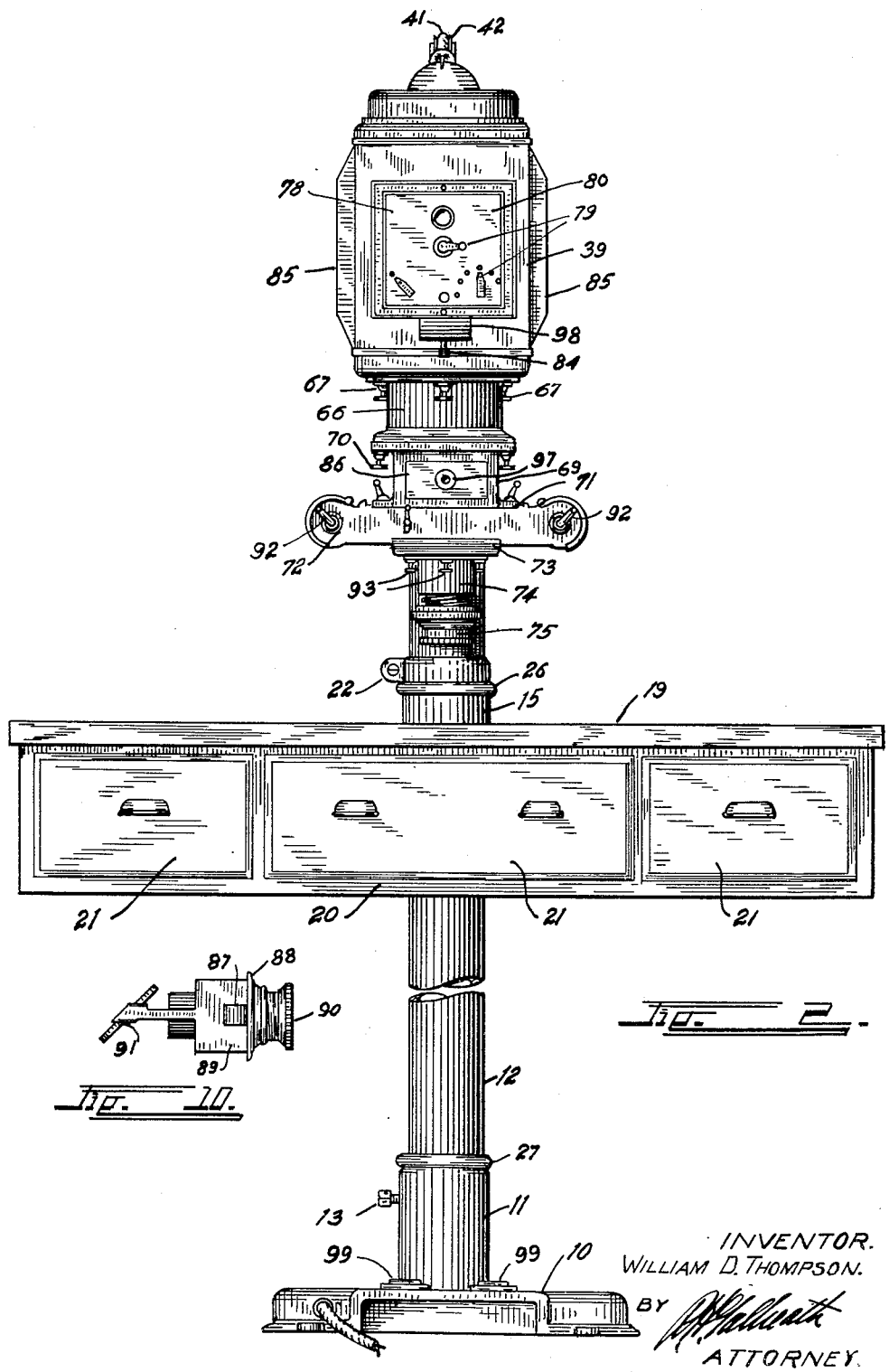
INVENTOR.
WILLIAM D. THOMPSON.
BY
ATTORNEY.

Jan. 30, 1951 W. D. THOMPSON 2,540,017
PHOTOGRAPHIC ENLARGER
Original Filed Oct. 24, 1946 4 Sheets-Sheet 3
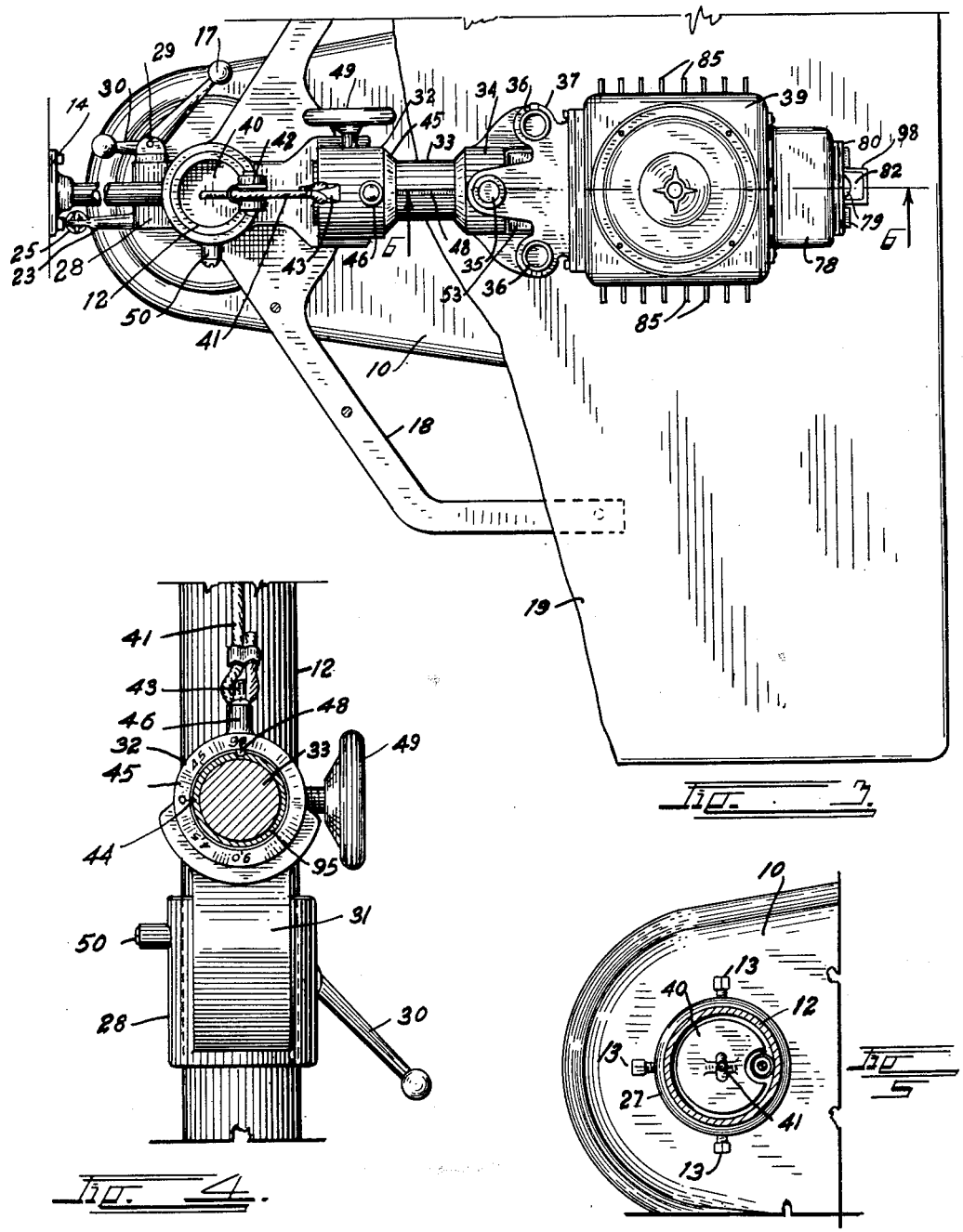
INVENTOR.
WILLIAM D. THOMPSON.
BY
ATTORNEY

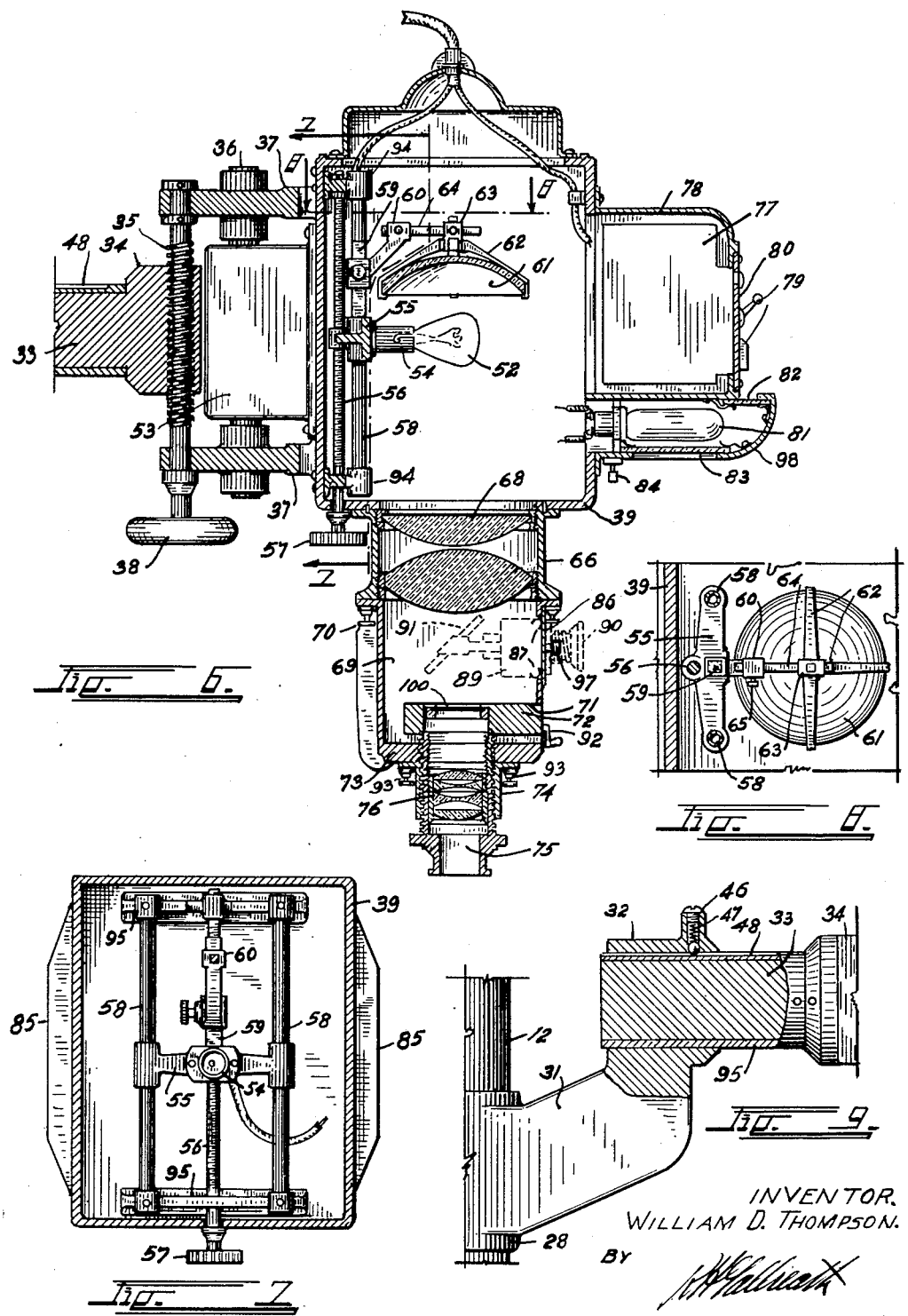

Patented Jan. 30, 1951

2,540,017

UNITED STATES PATENT OFFICE 2,540,017

PHOTOGRAPHIC ENLARGER

William D. Thompson, San Diego, Calif.

Substituted for application Serial No. 705,441, October 24, 1946. This application January 13, 1948, Serial No. 1,947

3 Claims. (Cl. 88—24)

This invention relates to a photographic enlarger, and this application is a substitute for applicant's original application filed October 24, 1946, under Serial No. 705,441, now abandoned. The principal object of the present invention resides in the provision of an enlarging apparatus which will be exceedingly rigid in construction and which can be easily and accurately adjusted to obtain maximum lighting efficiency and accurate focus at all positions so that perfect, clear-cut enlargements may be quickly and easily produced.

Other objects of the invention are:

To provide adjusting means which will allow exceedingly accurate positioning of the easel, the lamp house, and the lamp so that highly efficient results in focusing, framing, sizing, and light spread may be accomplished;

To provide an efficient and compact assembly having storage space for paper and supplies, a safe working light for use in positioning the paper on the table, a timing switch, an accurate focus indicator, and a roll film holder all combined in a single, unitary, easily-operated machine;

To provide in an enlarger of this type a film holder which will be completely dust-tight; which will eliminate the possibility of finger prints on the film; which will provide means for cleansing the film each time it is used; and which will provide a convenient method of storing each roll of negatives; and To provide a pressure plate which can be brought to bear against the portion of the film being enlarged so as to hold it on a true, flat plane provided with means for releasing the pressure plate when it is desired to move the film to prevent scratching thereof.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 2 is a front view thereof;

Fig. 3 is a fragmentary top view of the enlarger;

Fig. 4 is an enlarged detail sectional view of a supporting arm employed on the enlarger, taken on the line 4—4, Fig. 1;

Fig. 5 is a similarly enlarged detail section taken on the line 5—5, Fig. 1;

Fig. 6 is an enlarged longitudinal, vertical section taken on the line 6—6, Fig. 3;

Fig. 7 is a fragmentary detail section taken on the line 7—7, Fig. 6;

Fig. 8 is a similar section taken on the line 8—8, Fig. 6;

Fig. 9 is a detail view partly in section illustrating the mounting of a lamp house supporting arm employed in the improved enlarger; and Fig. 10 is a side view of a focusing device which may be used with the improved enlarger.

Figure 1:
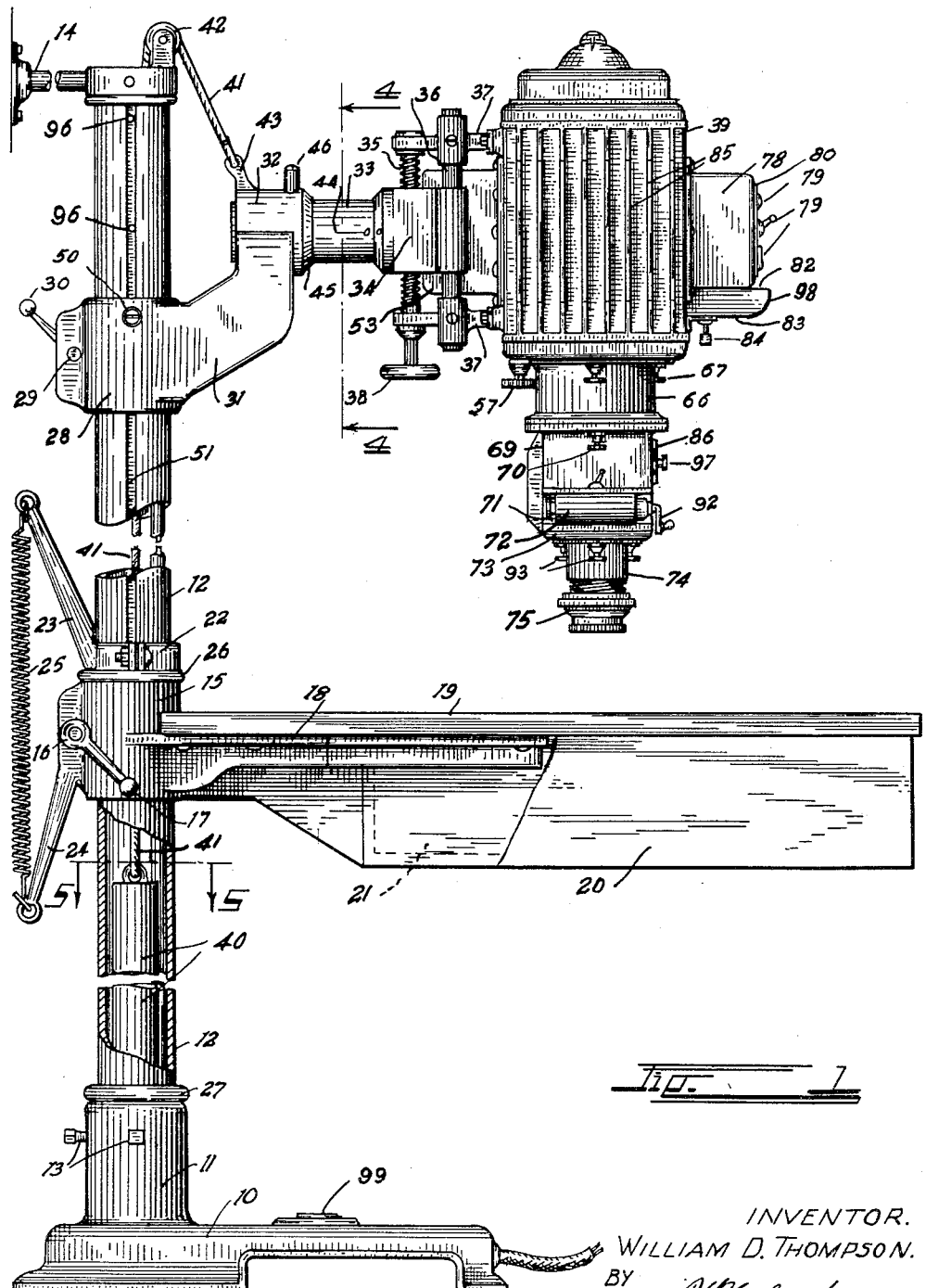
Fig. 1 is a fragmentary side view of the improved enlarger.

The improved enlarger is supported from a relatively heavy base member 10 having an upstanding, sleeve-like socket 11 formed thereon. A vertical, tubular standard 12 is positioned in and extends rigidly and vertically from the socket 11, it being securely locked therein by means of suitable set screws 13. The standard 12 may, if desired, be provided at its top with a wall bracket 14, by means of which it may be rigidly secured to a convenient wall or other support.

A split, table-supporting guide sleeve 14 is slidably mounted on the standard 12. The split in the guide collar 15 may be contracted by means of a clamp bolt 16 having an integral wrench handle 17. Two table-supporting brackets 18 are formed on and extend outwardly in a V-shape from the collar 15 to support a table board 19. A drawer case 20, having a plurality of forwardly-opening drawers 21, is mounted below the table board 19.

A stop sleeve 22 may be clamped about the standard 12 at any desired vertical position thereon. The sleeve 22 is positioned above the collar 15 and acts as a pre-set stop therefor.

A spring arm 23 is formed on and projects upwardly and rearwardly from the sleeve 22, and a similar spring arm 24 projects downwardly from the collar 15. A tension spring 25 is stretched between the extremities of the two arms 23 and 24 and serves to counteract the weight of the table 19 and its drawer case 20.

A resilient cushion ring 26 separates the sleeve 22 and the collar 15, and a similar resilient cushion ring 27 is positioned above the socket 11. The sleeve 22 can be pre-set at a desired enlargement point. The collar 15 can then be adjusted about the standard 12 to any desired position without losing the focus since the spring 25 will maintain the collar 15 at the proper elevation. When set, the collar may be locked by the clamp bolt 16. Should the sleeve and collar be accidentally dropped the impact will be absorbed.

The lamp house clamp 28 carries a spring-actuated click ball device 50 which engages a vertical groove 51 in the standard 12 when the lamp house is in the proper center position over the table 19.

A split lamp house clamp 28 is slidably and rotatably mounted on the standard 12 and may be clamped in any desired position thereon by means of a second clamp bolt 29 which is rotatable from a bolt handle 30. A bracket arm 31 projects from the clamp 28 and supports a horizontal, tubular guide member 32. The guide member 32 slidably supports a horizontal, lamp house supporting arm 33.

The arm 33 terminates in a forked head member 34 provided with a vertical, threaded passage for receiving a threaded adjusting screw 35, and with two spaced-apart, vertical guide passages for receiving two guide bars 36. It is preferred to form the arm 33 as an integral cast part of the head member 34 and to surround the bar with a wear resisting sleeve of steel or the like as indicated at 95 in Fig. 4. The bars 36 are secured in upper and lower lamp house brackets 37 positioned above and below the head member 34. The screw 35 is rotatably mounted in the brackets 37 and terminates in a hand wheel 38 at its lower extremity.

It can be readily seen that, as the screw is rotated in one direction, it will cause the brackets 37 to move upwardly, guided by the bars 36, and when rotated in the other direction, will cause these brackets to move downwardly.

The brackets 37 are attached to and support a lamp housing 39. The weight of the lamp housing 39 and its supporting structure is counterbalanced by means of a counter-weight 40 secured on the extremity of a counter-weight cable 41. The counter-weight 40 is suspended within the hollow standard 12 and its cable 41 rides over a guide pulley 42 at the top thereof, terminating in a cable bracket 43 on the guide member 32.

The supporting arm 33 is rotatable in the member 32. Its position in the member is indicated by means of a pointer line 44 engraved longitudinally in the member 33. The pointer line indicates positions on an annular index scale 45 on the member 32. This enables the lamp housing 39 to be rotated to any desired angle from the vertical for producing special effects, for correcting distortions in the images, and for projecting an image onto a side wall or screen.

The vertical position of the lamp housing is automatically indicated by means of a click ball 46, which is urged by means of a spring 47 into a longitudinal groove 48 in the top of the supporting arm 33. The arm is also adjustable longitudinally in the member 32 for properly positioning the image on the table 19. It may be locked in any desired extended or angular position by means of a hand wheel screw 49.

The lamp house contains an automotive type lamp 52 supplied with reduced voltage current from a suitable transformer 53 which is mounted on the back of the lamp house within the confines of the head member 34 and the brackets 37.

The lamp is carried in a suitable receiving socket 54 mounted on a cross-head 55. The cross-head is moved vertically in the lamp house by means of a threaded shaft 56 rotatable from a hand wheel 57 on the exterior of the lamp house. The vertical movement of the cross-head is guided by means of two slide rods 58 supported by rod brackets 94 affixed to the back of the lamp house 39.

A square post 59 extends upwardly from the cross-head 55 to support a vertically adjustable reflector bracket 60. The bracket 60 supports a parabolic reflector 61, through the medium of reflector clamps 62 and a sliding clamp frame 63 which is mounted on a supporting rod 64 extending from the bracket 60. The bracket can be raised and lowered on the square post 59 and set in any desired position thereon by means of a set screw 65 and the frame 63 can be adjusted along and rotated about the rod 64 so as to position the reflector 61 at the proper focal point with reference to the lamp 52.

A condenser lens barrel 66 is removably attached to the bottom of the lamp house by means of suitable thumb screws 67. The barrel 66 contains conventional condensing lenses 68. A lens head chamber 69 is removably attached to the bottom of the barrel 66 by means of a second set of suitable thumb screws 70.

The lower portion of the chamber 69 is transversally slotted, as shown at 71, to receive a film holder 72 containing the film to be enlarged indicated at 100. The bottom of the chamber 69 is closed by means of a head plate 73 secured thereto by means of suitable thumb screws 93. The head plate 73 carries an internally threaded lens collar 74 in which an objective lens barrel 75 is threaded. The barrel 75 carries a conventional objective lens system 76. Rotation of the lens barrel 75 raises or lowers the objective lens system 76 to properly focus an image of the film 100 on the table 19.

The current to the lamp 52 is automatically controlled by means of a timing device 77 mounted in a timer housing 78 on the front of the lamp house 39. The controls of the timer 77, indicated at 79, are mounted on a control panel 80 in the front of the timer housing 78.

The mechanism of the timing device 77 is more fully illustrated and described in applicant's co-pending application, Serial No. 713,642, now abandoned.

The control panel 80 is illuminated by means of a pilot lamp 81, positioned in a light shield 98 positioned below the housing 78, through an upwardly facing window 82. The light from the lamp 81 also shines through a downwardly facing ruby glass window 83 to illuminate the table 19 with a safe photographic light. The pilot lamp is controlled from a pilot lamp switch 84.

The lamp house is provided with heat radiation fins 85. The chamber 69 is provided with a removable door 86 held in place by means of snap springs 87 and provided with a suitable handle 97. For focusing the enlarger, the door 86 is removed and a reflecting focusing device, such as illustrated in Fig. 10, is inserted into the chamber 69 as shown in broken line in Fig. 6.

The focusing device is described more in detail in applicant's co-pending application, Serial No. 705,442, now Patent No. 2,493,558, issued January 3, 1950. Briefly, it consists of a plate 88 which snaps into place in place of the door 86. The plate carries a lens tube 89 and an eye piece 90. The lens tube supports a 45° reflecting mirror 91. The focusing device makes use of the fact that the objective lens system 76 will project an image of the illuminated picture on the table board 19 onto the film in the holder 72. The mirror 91 will reflect this image as well as an image of the film emulsion through the eye piece 90 to the operator. The lens system is then adjusted to bring these two images into perfect alignment to insure perfect focus.

The film holder 72 comprises a housing having a film spool at each end operated by winding knobs 92 by means of which the film may be caused to travel across the path of the light from one spool to the other. This film holder is described more in detail in applicant's co-pending application, Serial No. 705,443, now Patent No. 2,461,668, issued February 15, 1949. It is believed that the convenience, accuracy and versatility of the improved enlarger will become apparent from the above description, as minutely accurate controls are provided for every adjustment. The usual enlarger has no provision for altering the position of the light source for varying film areas. An approximation only is obtained. A full utilization of the light and a perfect uniform light spread can only be obtained by having the light source at the exact focal point of the condensing lens system when the light from the latter is concentrated on the film area. Since the area varies with different sizes of films an accurate adjustment of light focus must be provided. This is true with this improved enlarger.

Three adjustments are provided to obtain convenient table height and accurate focus, that is, the collar 15, the clamp 28 and the hand wheel 38. An automatic return to a pre-set minimum after the table has been temporarily lowered to obtain a special enlargement of a portion of a specific print. The spring 25 and the counterweight 49 both contribute to a reduction of the manual effort required by the operator.

Indentations 96 are milled into the bottom of the click ball groove 51 in the standard 12 at pre-determined points for automatically registering the lamp housing clamp 28 at pre-determined enlarging positions, such as five inches by seven inches, eight inches by ten inches, eleven inches by fourten inches, etc., so that the operator can quickly position the lamp housing for any desired enlargement, the final adjustment, of course, being made by means of the hand wheel 38. The click ball device 50 does not prevent the bracket arm 31 from being swung from side to side, as angular pressure on the arm will release the click ball from the groove 51, as is usual with conventional click ball devices.

In the conventional enlarger the film is locked in close proximity to the condensing lenses. In this improved enlarger the film is locked a considerable distance below the condensing lenses, due to the height of the lens head chamber 69. This places the negative at the concentrated position of the light beam from the condensing lenses at a position where the beam will just cover the entire negative. This greatly increases the brilliance of the negative, since all of the available light is concentrated upon the negative at this point. This avoidance of the usual light waste of the conventional enlarger allows a much smaller source of light to be used in the improved enlarger with equal results.

The base member 10 is provided with a plurality of electric outlets 99 which provide convenient means for attaching cords to other devices.

While a specific form of the improvement has been described and illustrated herein, it is desired to be understood that the same may be varied, with the scope of the appended claims, without departing from the spirit of the invention.

Having thus described the invention, what is claimed and desired secured by Letters Patent is:

1. In a photographic enlarging machine of the type described, a lamp house; a table board; a vertical, tubular standard; a lamp house clamp surrounding said standard; a bracket member extending from said lamp house clamp; a horizontally positioned tubular guide member carried by said bracket member; a cylindrical supporting arm rotatably and horizontally adjustable within said guide member; means for supporting said lamp house from said supporting arm; and a spring-actuated click ball device carried by said lamp house clamp and engaging said standard, there being a vertical guide slot in said standard for receiving said ball so as to guide said bracket member in a vertical plane, and there being spaced-apart depressions in said slot for receiving said ball device for supporting said lamp house at pre-set positions.

2. Means for supporting a lamp house in an enlarging machine comprising: a vertical tubular standard; a lamp house clamp surrounding said standard; a bracket member extending from said lamp house clamp; a horizontally positioned tubular guide member carried by said bracket member; a cylindrical supporting arm rotatably and horizontally adjustable within said guide member; means for supporting said lamp house from said supporting arm; means for clamping said supporting arm in said guide member; and a click ball device carried by said guide member and engaging said supporting arm, there being a longitudinally extending groove in said supporting arm for receiving said click ball device when said lamp house is in the vertical position.

3. Means for supporting a lamp house in an enlarging machine comprising: a vertical, tubular standard; a lamp house clamp surrounding said standard; a bracket member extending from said lamp house clamp; a horizontally positioned tubular guide member carried by said bracket member; a cylindrical supporting arm rotatably and horizontally adjustable within said guide member; a Y-shaped head member carried by said supporting arm and lying normally in a horizontal plane; a guide bar extending vertically through each fork of the Y-shaped head member; lamp house brackets securing the upper and lower extremities of said guide bars to said lamp house; and screw means threaded through said head member for moving said guide bars vertically through said head member.

WILLIAM D. THOMPSON.

REFERENCES CITED

The following references are of record in the file of this patent:

UNITED STATES PATENTS

| Number | Name | Date |
|--------|------|------|
| 450,250 | Nacke | Apr. 14, 1891 |
| 1,768,755 | Gaxiola | July 1, 1930 |
| 2,254,125 | Tarullo | Aug. 26, 1941 |
| 2,294,585 | Thomson | Sept. 1, 1942 |
| 2,298,741 | Lazna | Oct. 13, 1942 |
| 2,303,920 | Drucker | Dec. 1, 1942 |
| 2,344,558 | Moore | Mar. 21, 1944 |
| 2,360,215 | Falck | Oct. 10, 1944 |
| 2,390,065 | Gelb | Dec. 4, 1945 |